United States Patent
Mroczek et al.

(10) Patent No.: US 6,523,106 B1
(45) Date of Patent: Feb. 18, 2003

(54) METHOD AND APPARATUS FOR EFFICIENT PIPELINING

(75) Inventors: Michael Mroczek, Granite Bay, CA (US); Umberto Santoni, Chandler, AZ (US); Nazar A. Zaidi, San Jose, CA (US); Mike Morrison, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/217,774

(22) Filed: Dec. 21, 1998

(Under 37 CFR 1.47)

(51) Int. Cl.[7] .............................................. G06P 15/80
(52) U.S. Cl. ........................................ 712/22; 712/220
(58) Field of Search ....................... 712/220–222, 712/2, 20, 21, 22.3, 24, 200, 201, 24.23, 22, 23

(56) References Cited

U.S. PATENT DOCUMENTS 5,555,428 A * 9/1996 Radigan et al. ............... 712/22
5,966,528 A * 10/1999 Wilkinson ..................... 712/20
6,035,391 A * 3/2000 Isaman ........................ 712/222
6,047,369 A * 4/2000 Colwell et al. ............. 712/217
6,094,715 A * 7/2000 Wilkinson ..................... 712/20

OTHER PUBLICATIONS interl, "iAPX 86/88, 186/188User's Manual", 1985, pp. 3–1 to 3–18.*

* cited by examiner

Primary Examiner—John F. Niebling
Assistant Examiner—Stacy A Whitmore
(74) Attorney, Agent, or Firm—Schwegman, Lundberg, Woessner & Kluth, P.A.

(57) ABSTRACT

Only one pipe in superscalar microprocessor contains particular functional logic necessary to process a specific instruction. When the specific instruction appears in an instruction stream, the microprocessor replicates the specific instruction so that there are as many identical instructions in the stream as there are pipes. The identical instructions appear contiguously in the instruction stream. Each identical instruction is processed by a different one of the pipes. The pipe with the particular functional logic performs the necessary operations for the specific instruction while the other pipes treat the instruction as a null operation.

15 Claims, 7 Drawing Sheets ial unit microprocessor 101 coupled to a...

METHOD AND APPARATUS FOR EFFICIENT PIPELINING

FIELD OF THE INVENTION

The present invention is related to a superscalar microprocessor and in particular to steering instructions down a pipe in such a microprocessor.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1997 Intel Corporation, All Rights Reserved.

BACKGROUND OF THE INVENTION

In a microprocessor with multiple pipelines, either each pipe must contain identical functional logic, since any instruction can be processed in any pipe, or particular instructions must be steered to a pipe which contains the specific functional logic necessary to process the instruction. Neither solution is wholly satisfactory.

Incorporating into each pipe the functional logic necessary to process all instructions in the instruction set for the microprocessor increases the total area of the microprocessor. As the density of logic in microprocessors increases, any additional area taken up by duplicating infrequently used functional logic across all the pipes introduces constraints on microprocessor design.

On the other hand, if only one pipe contains the particular functional logic, then steering logic must be incorporated into the microprocessor to ensure that the instruction which requires that logic is directed to the appropriate pipeline. Moreover, steering logic frequently introduces timing "bubbles" into the instruction stream, so complex timing logic is necessary to handle time-critical dependencies between instructions. Such steering and timing logic impacts the performance of the microprocessor and is difficult to design and debug.

Therefore, a need exists in the microprocessor art for a pipeline arrangement which minimizes the area required for the pipes while not requiring additional complex steering and timing logic.

SUMMARY OF THE INVENTION

Only one pipe in a superscalar microprocessor contains particular functional logic necessary to process a specific instruction. When the specific instruction appears in an instruction stream, the microprocessor replicates the specific instruction so that there are as many identical instructions in the instruction stream as there are pipes. The identical instructions appear contiguously in the instruction stream. Each identical instruction is processed by a different one of the pipes. The pipe with the particular functional logic performs the necessary operations for the specific instruction while the other pipes treat the instruction as if it were a null operation.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures. Signals and connections may be referred to by the same reference number or label, and the actual meaning will be clear from its use in the context of the description.

Figure 1:
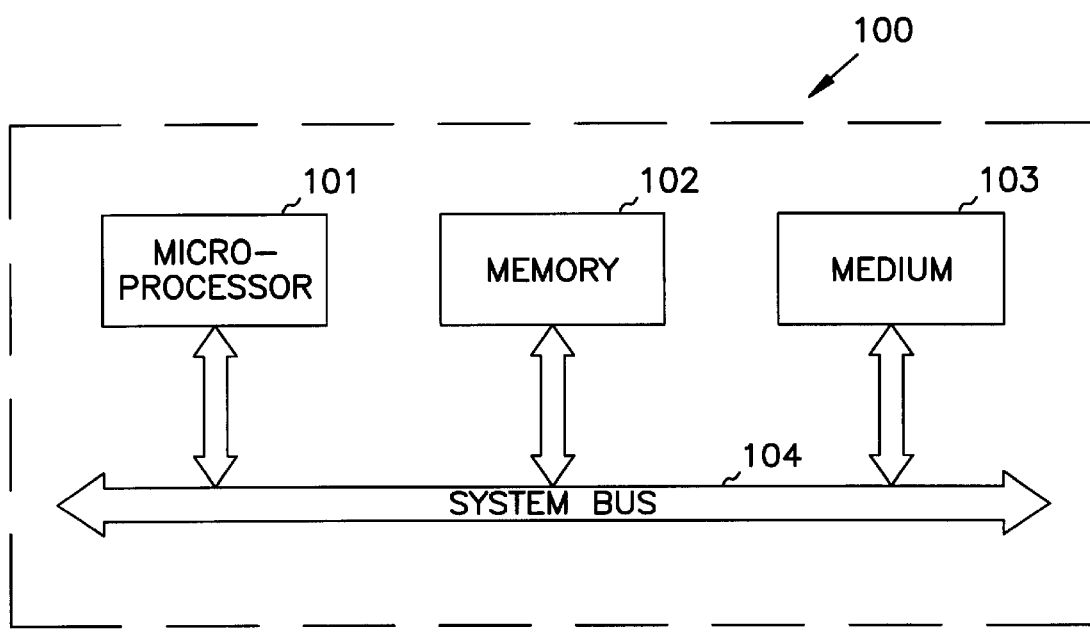
FIG. 1 is a block diagram of a computer system.

FIG. 1 shows a block diagram of computer 100 having a pipelined functional unit microprocessor 101 coupled to a memory 102 and to a computer-readable medium 103 through a system bus 104. While only one microprocessor is illustrated in FIG. 1, the computer 100 can also be configured with two or more microprocessors as is well-known in the art. One of skill in the art will readily recognize that memory 102 can be read-only memory (ROM) or random access memory (RAM), and the like, or a combination of memory types. Similarly, one of skill in the art will immediately comprehend that the computer-readable medium 103 can be any type of electronic medium such as floppy disk, hard disk, CD-ROM, or the like. The computer-readable medium 103 also equally characterizes electronic signals transmitted through a physical or wireless network to the computer 100. The memory 102 and the computer-readable memory are used to store instructions and data for processing by the microprocessor 101. The processing of instructions and data by the microprocessor is controlled by program logic which can originate in hardware, firmware, or software.

Figure 2:
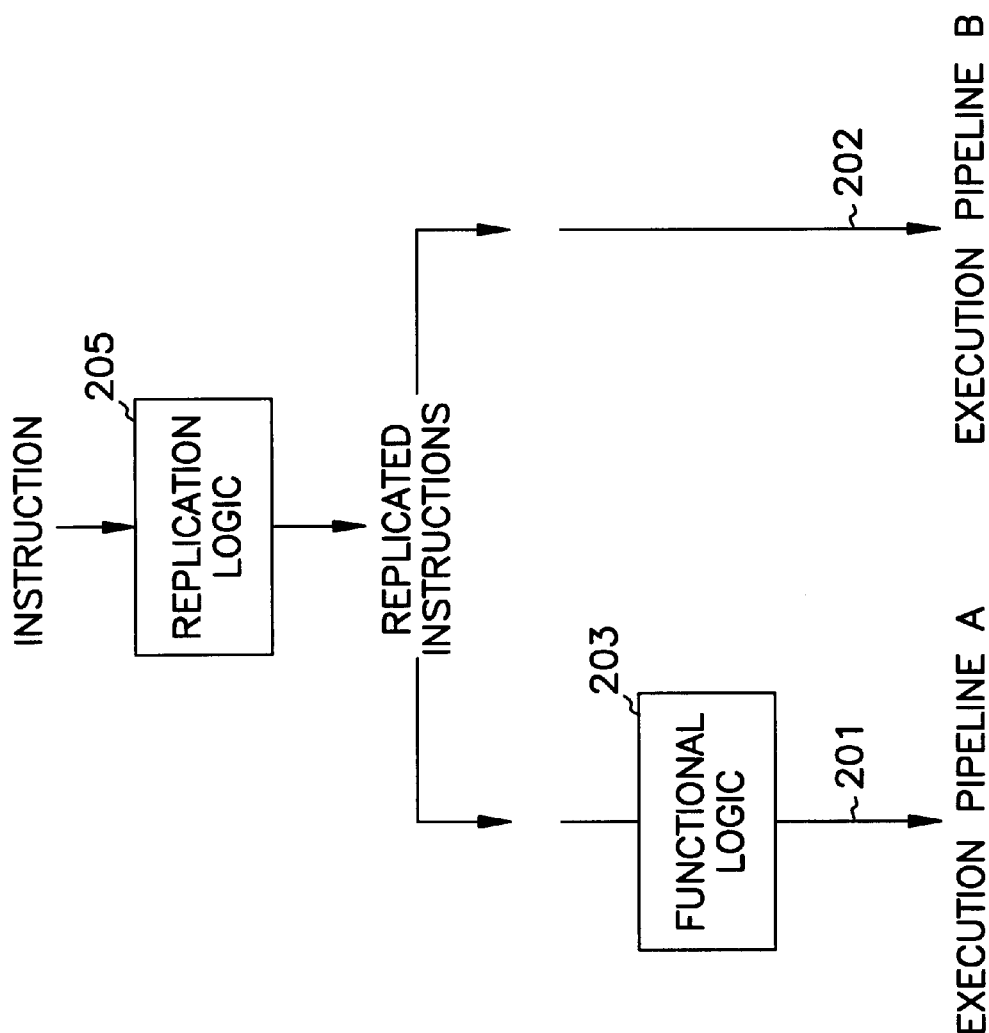
FIG. 2 is a block diagram of an exemplary embodiment of the invention incorporated in multiple pipelines in a microprocessor.

FIG. 2 illustrates an exemplary embodiment of a superscalar (multi-issue pipeline) microprocessor, suitable for use as the microprocessor 101, which contains two pipes 201, 202. Each of the pipes 201, 202 processes a single instruction at a time and can process more than one type of instruction. The pipes in the exemplary embodiments are described as processing a single instruction in a single cycle for ease of explanation. The invention is equally applicable to a superscalar microprocessor in which the multiple pipes handle instructions that require more than a single cycle to process provided each pipe processes only one of the replicated instructions as described below.

Block 203 represents particular functional logic necessary to process a specific instruction in the instruction set of the microprocessor 101. When the specific instruction requiring the functional logic 203 is encountered in the instruction stream, replication logic 205 inserts a second identical instruction in the instruction stream, contiguous to the specific instruction. The regular instruction steering logic in the microprocessor assigns one of the instructions to pipe 201 and the other instruction to pipe 202. The instruction executing in pipe 201 is processed by the functional logic 203 while the pipe 202 performs no processing on the other instruction, i.e., the instruction is treated as a NOP (null operation) instruction in pipe 202. When any other instruction (other than the specific instruction requiring the functional logic 203) is encountered in the instruction stream, the replication logic 205 is bypassed and the regular steering logic assigns the instruction to one of the pipes for processing. The replication logic 205 is located prior to the microprocessor logic (not shown) which dispatches the instructions to the pipes.

The identical instructions do not have to be processed by the two pipes during the same clock cycle as long as there are no "intervening" instruction(s) in the pipes. Therefore, the instruction "I" can be processed in pipe 201 during clock cycle X and the duplicated instruction "I'" can be processed in pipe 202 during clock cycle X ± n as shown in Table 1. In the first instance of instructions I and I', instruction I is processed in pipe 201 during cycle X and instruction I' is processed in pipe 202 during cycle X+1. The pipes next process regular instructions "J" and "K" during cycles X+2 and X+3, respectively. The second instance of instructions I and I' are processed in the same clock cycle, X+4. Instruction I' is treated as a NOP in pipe 202.

TABLE 1

| Clock Cycle | Pipe 201 | Pipe 202 |
|---|---|---|
| X | I | |
| X + 1 | | I' |
| X + 2 | J | |
| X + 3 | | K |
| X + 4 | I | I' |

Table 2 illustrates the same sequence of instructions as in Table 1, but in this instance, I' is processed in pipe 201, while I is processed in pipe 202, so that instruction I is treated as the NOP in pipe 202.

TABLE 2

| Clock Cycle | Pipe 201 | Pipe 202 |
|---|---|---|
| X | I' | |
| X + 1 | | I |
| X + 2 | J | |
| X + 3 | | K |
| X + 4 | I' | I |

Table 3 illustrates the improper case in which the instruction J intervenes between the execution of the identical instructions, so both instructions I and I' are processed by the pipe 201, causing the instruction to be executed twice. Similarly, if both I and I' were forced through pipe 202 by an intervening instruction, both instructions would be treated as NOP instructions, causing the instruction to be unexecuted. The exemplary embodiments of the invention avoid these errors in execution because the identical, replicated instructions appear contiguously in the instruction stream.

TABLE 3

| Clock Cycle | Pipe 201 | Pipe 202 |
|---|---|---|
| X | I | |
| X + 1 | | J |
| X + 2 | I' | |

Because the functional logic 203 is added to only a single pipe, the pipes in a microprocessor utilizing the exemplary embodiment of the invention require less area than those in a symmetric microprocessor having the functional logic 203 incorporated into each pipe. Furthermore, replicating the instruction and processing one of the identical instructions in each of the pipes guarantees the instruction will be processed in the pipe having the functional logic 203 without the special steering logic required in a non-symmetric microprocessor that must direct the specific instruction to the particular pipe for processing.

Figure 3:
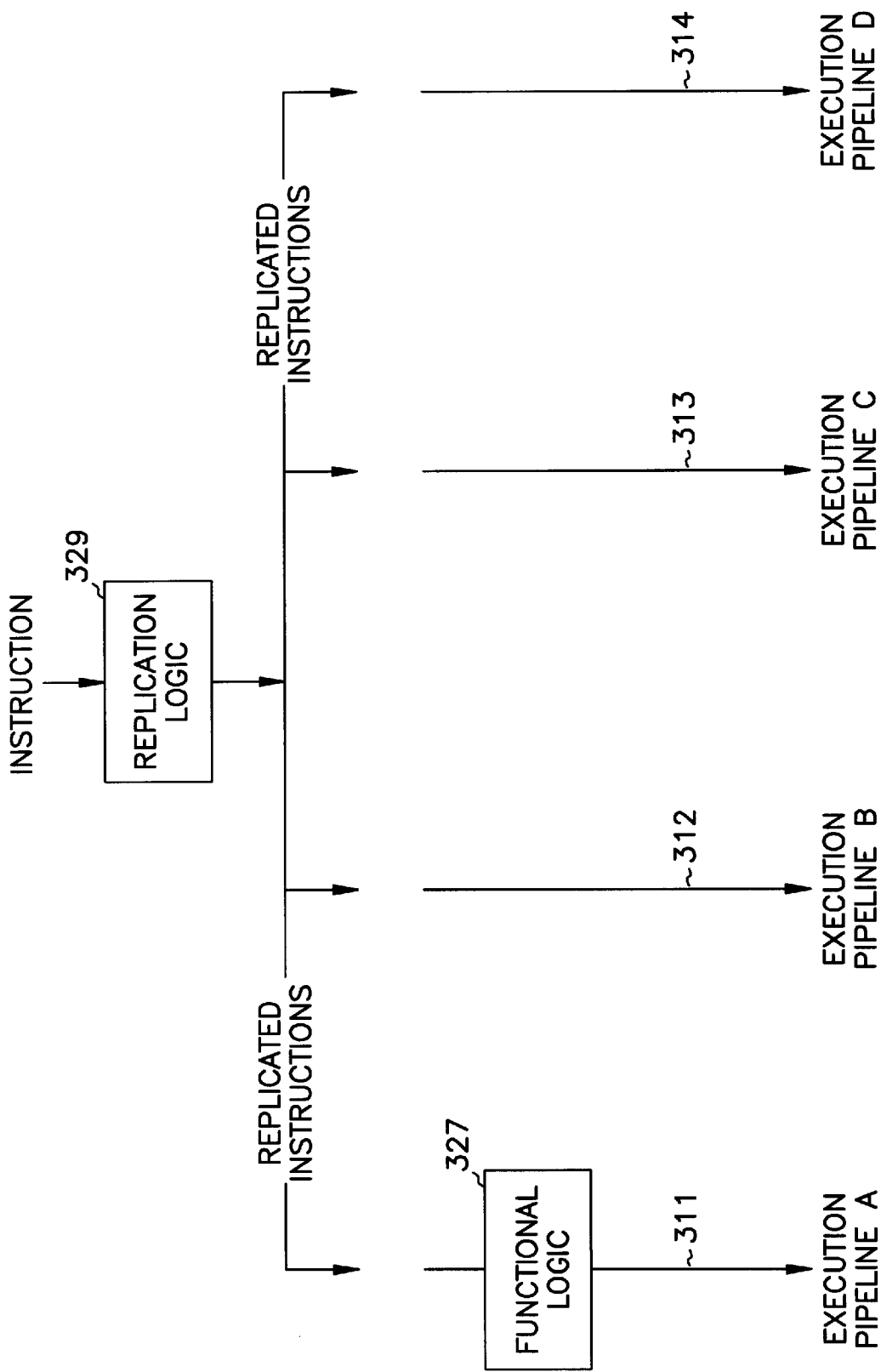
FIG. 3 is a block diagram of an exemplary embodiment of the invention shown in FIG. 3 incorporated into a microprocessor with additional pipelines.

The exemplary embodiment of the invention described above is also easily scalable as shown in FIG. 3. FIG. 3 illustrates a multi-issue pipeline microprocessor having four pipes 311, 312, 313, 314. Pipe 311 contains functional logic represented by block 327 (corresponding to block 203 in FIG. 2). Now when the specific instruction requiring the functional logic in block 327 is encountered in the instruction stream, the instruction is replicated three times by replication logic 329 so that four identical instructions appear contiguously in the instruction stream. Each instruction is assigned to one of the pipes 311–314. The identical instructions are processed as described above. Thus, in a microprocessor having N multi-issue pipes, the special functional logic is present on one pipe, and the instruction requiring the logic is replicated N−1 times. The resulting N identical instructions are processed by the N pipes.

Figure 4:
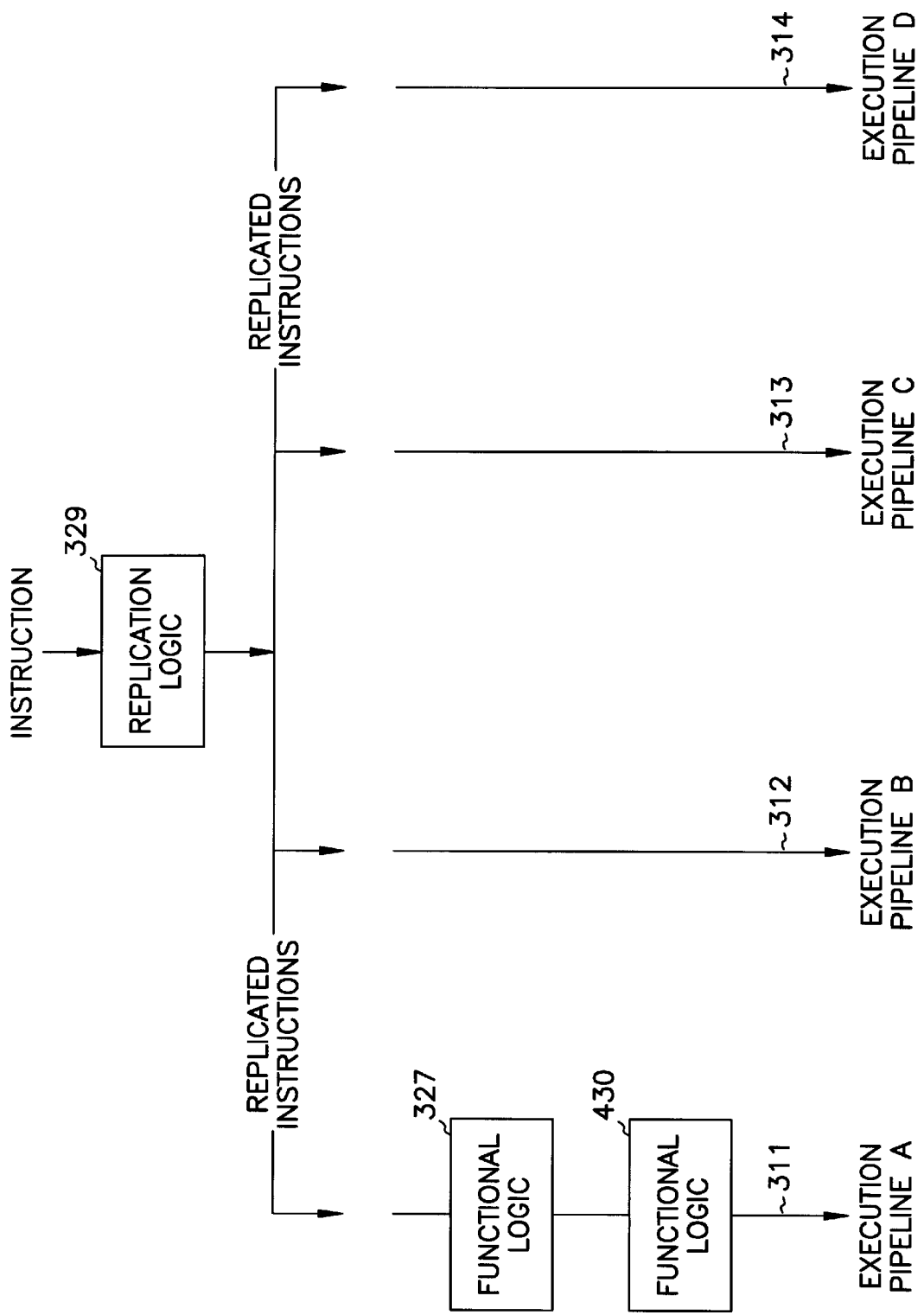
FIG. 4 is a block diagram of an alternate exemplary embodiment of the invention shown in FIG. 3.
Figure 5:
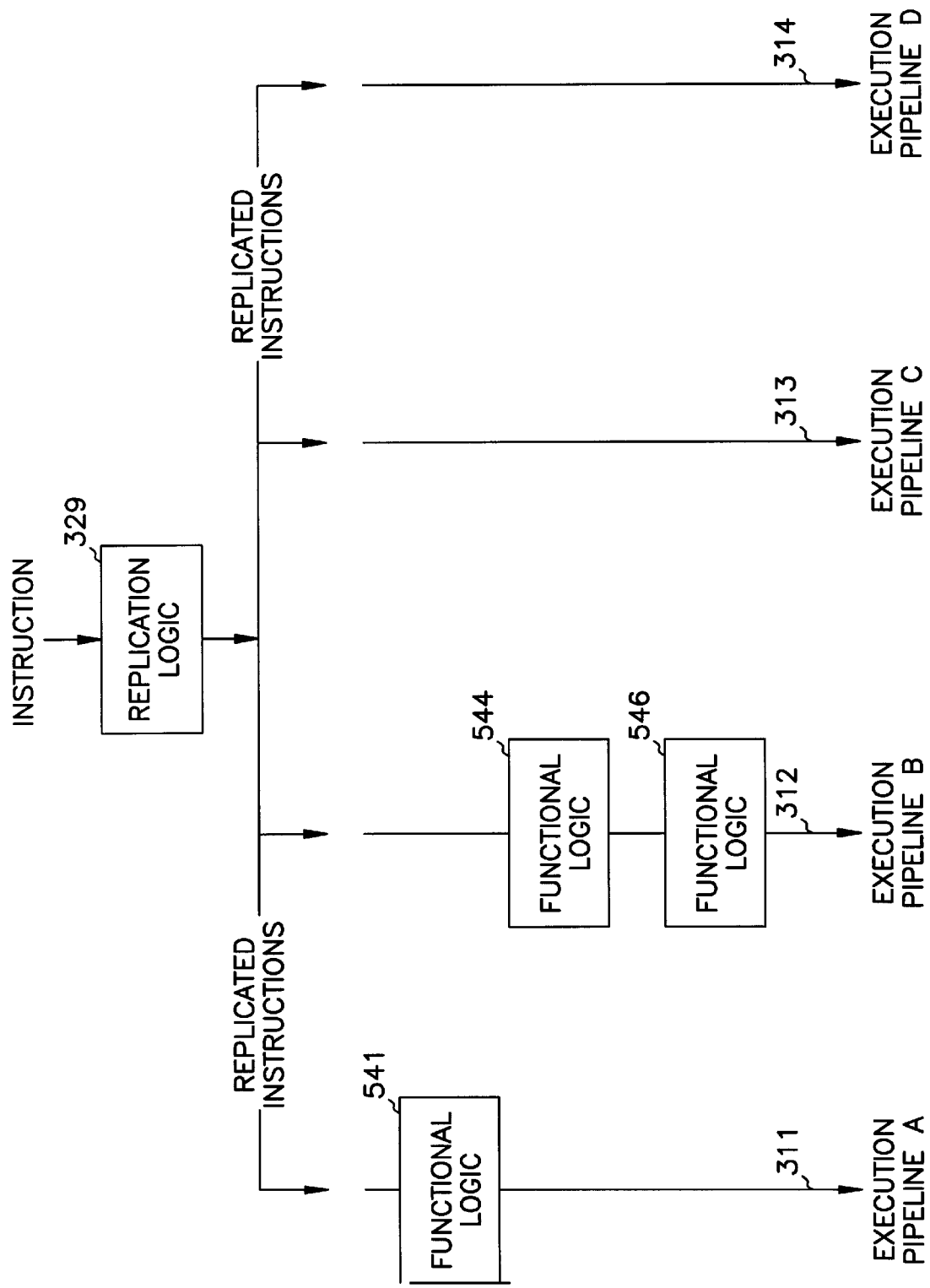
FIG. 5 is a block diagram of another alternate exemplary embodiment of the invention shown in FIG. 3.

Furthermore, the exemplary embodiment described above is equally applicable to instruction sets in which multiple instructions require special processing as shown in FIGS. 4 and 5. In FIG. 4, additional functional logic 430 required to process a second special instruction is incorporated into pipe 311. In an alternate embodiment illustrated in FIG. 5, three special instructions are divided into two subsets. The functional logic 541 for the single instruction in one subset is incorporated into pipe 311 and the functional logic 544, 546 for the two instructions contained in the other subset are incorporated into pipe 312. The division of multiple special instructions into subsets is based on processing load considerations or other balancing factors well-known to one skilled in the art.

Figure 6:
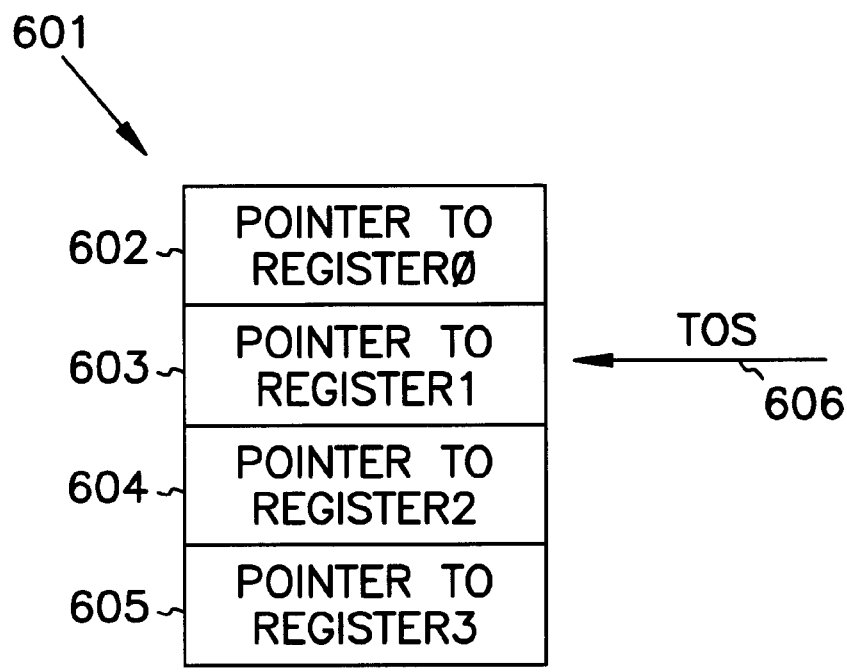
FIG. 6 is a block diagram of an exemplary embodiment of a microprocessor stack.
Figure 7:
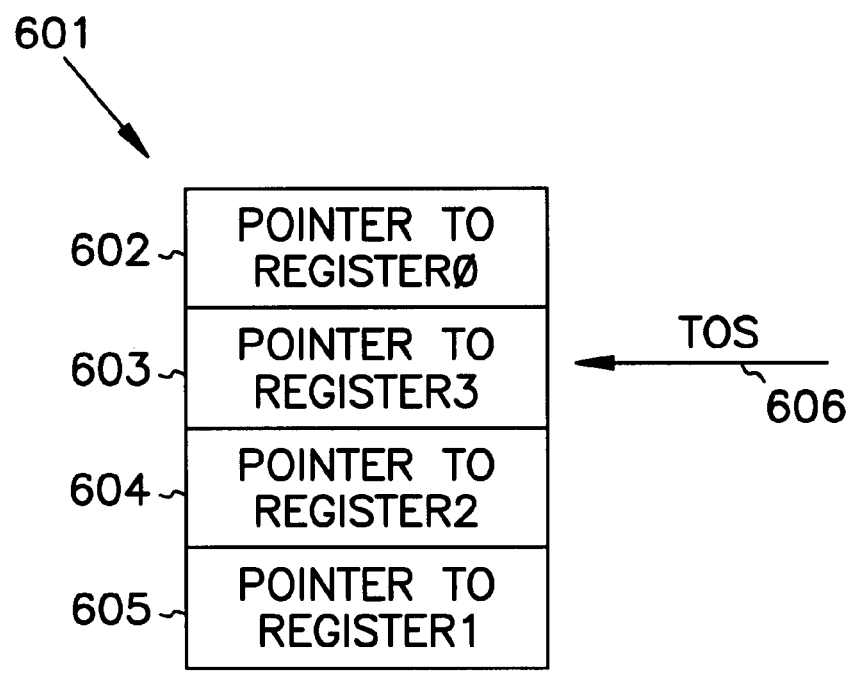
FIG. 7 is a block diagram of the microprocessor stack of FIG. 6 after execution of a particular instruction.
Figure 8:
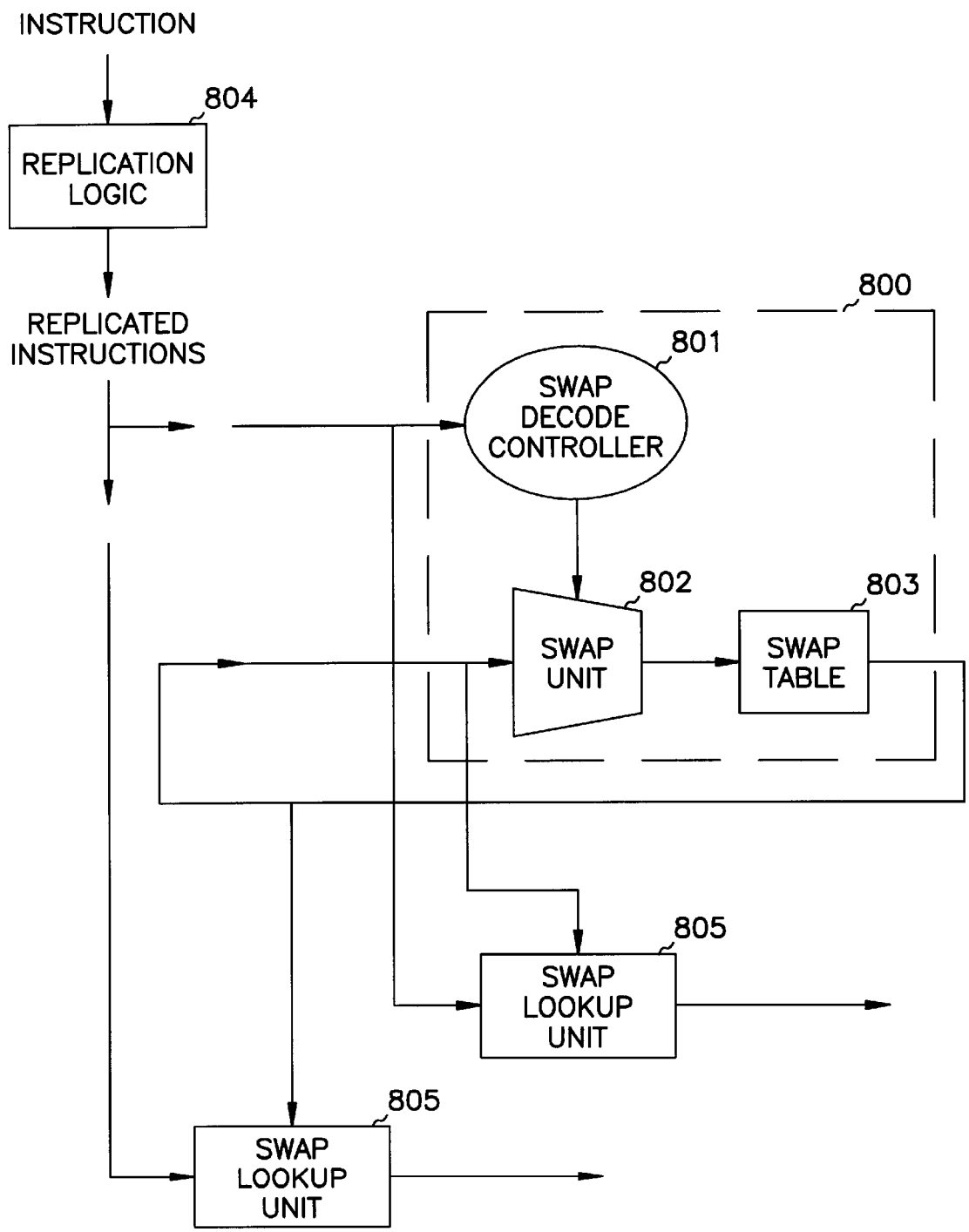
FIG. 8 is a flow diagram of an exemplary embodiment of the invention that processes the particular instruction that operates on the microprocessor stack shown in FIG. 7.

Use of a particular embodiment of the invention to process a floating point exchange (FXCH) instruction is next discussed in conjunction with FIGS. 6, 7 and 8. The FXCH instruction swaps the contents of two registers. The microprocessor in this exemplary embodiment uses four floating point registers that are addressed through pointers stored in slots in a table or stack 601 as illustrated in FIGS. 6 and 7. The register currently being operated on is referred to as the current or top-of-stack (TOS) register and is identified by a TOS pointer 606. Therefore, swapping the contents of two registers can be accomplished by swapping their pointers in the table 601 as illustrated in FIGS. 6 and 7.

FIG. 6 shows the table 601 before an FXCH instruction is executed to swap the contents of register3 with the contents of register1. Slot 603 contains the pointer to register1, slot 605 contains the pointer to register3, and the TOS pointer 606 points to slot 603. After the FXCH instruction is executed, the current register (slot 603) as designated by the TOS pointer 606 contains the pointer to register3 while slot 605 contains the pointer to register1, as shown in FIG. 7.

The additional logic which is necessary to support the implementation of the FXCH instruction described immediately above includes a swap decode controller that decodes the FXCH instruction, a swap unit that performs the swap, and a swap table that provides feedback to the swap unit regarding the previously executed FXCH instruction. Because the instructions in a pipeline microprocessor can be processed out-of-order, an instruction that is executed after the FXCH instruction may need to use the registers as they existed before the FXCH instruction was executed. A swap lookup unit is used to track the swapping operations so that the dependencies among instructions are preserved.

FIG. 8 illustrates the special functional logic necessary to support the FXCH instruction incorporated into one of a pair of microprocessor pipes in a circuit in accordance with the exemplary embodiments of the invention described above. The swap decode controller 801, the swap unit 802 and the swap table 803 collectively make up the special functional logic 800 on one pipe. Because a non-FXCH instruction can be processed by either pipe in the pair, the required swap lookup unit logic 805 is incorporated into both pipes.

The FXCH instruction is replicated by the replication logic 804 and the normal steering logic of the microprocessor assigns one of the identical FXCH instructions to each of the pipes for processing as explained above.

One of skill in the art will immediately recognize that the embodiment of the invention in an FXCH instruction is not limited to only stacked register microprocessors. Furthermore, one of skill in the art will readily appreciate that the exemplary embodiment of the invention used to process FXCH instructions is applicable to any microprocessing unit which must handle serial dependencies among the instructions it processes.

Thus, the invention eliminates the need for extra steering or complex timing logic required by non-symmetric microprocessors in executing instructions requiring special functional logic. Additionally, incorporating the functional logic in only one of the pipes in the microprocessor reduces the area required by the pipes over that required by traditional symmetric microprocessors.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A microprocessor, comprising:
    a plurality of pipes, each of the pipes being capable of processing a single instruction at a time and each of the pipes being capable of processing more than one type of instruction;
    only a first pipe of the plurality of pipes containing functional logic particular to a first instruction; and
    logic to replicate the first instruction into a like plurality of contiguous first instructions so that each of the plurality of pipes processes a different one of the plurality of first instructions;
    wherein the first pipe performs one or more operations for the first instruction and the rest of the plurality of pipes process the first instruction as a null operation.

2. The microprocessor of claim 1, wherein:
    only a second pipe of the plurality of pipes contains functional logic particular to a second instruction; and
    the logic replicates the second instruction into a like plurality of contiguous second instructions;
    the second pipe performs one or more operations for the second instruction and the rest of the plurality of pipes process the second instruction as a null operation.

3. The microprocessor of claim 1, wherein:
    only the first pipe of the plurality of pipes contains functional logic particular to a second instruction; and
    the logic replicates the second instruction into a like plurality of contiguous second instructions;
    the first pipe performs one or more operations for the second instruction and the rest of the plurality of pipes process the second instruction as a null operation.

4. A method of steering a first specific instruction in a microprocessor having a plurality of pipes, comprising:
    incorporating, in a first pipe and only in the first pipe, an operation particular to the first specific instruction;
    replicating the first specific instruction into a first plurality of contiguous identical instructions so that there is a one-to-one correspondence between the plurality of pipes and the first plurality of contiguous identical instructions; and
    processing each one of the first plurality of identical instructions in a different one of the plurality of pipes;
    wherein the first pipe performs one or more operations for the first instruction and the rest of the plurality of pipes process the first instruction as a null operation;
    wherein each of the plurality of pipes is capable of processing a single instruction at a time and each of the pipes is capable of processing more than one type of instruction.

5. The method of claim 4, further comprising:
    incorporating, in the first pipe and only in the first pipe, an operation particular to a second specific instruction;
    replicating the second specific instruction into a second plurality of contiguous identical instructions so that there is a one-to-one correspondence between the plurality of pipes and the second plurality of contiguous identical instructions; and
    processing each one of the second plurality of identical instructions in a different one of the plurality of pipes;
    wherein the first pipe performs one or more operations for the second specific instruction and the rest of the plurality of pipes process the second specific instruction as a null operation.

6. The method of claim 4, further comprising:
    incorporating, in a second pipe and only in the second pipe, an operation particular to a second specific instruction;
    replicating the second specific instruction into a second plurality of contiguous identical instructions so that there is a one-to-one correspondence between the plurality of pipes and the second plurality of contiguous identical instructions; and processing each of the second plurality of identical instructions in a different one of the plurality of pipes;

wherein the second pipe performs one or more operations for the second specific instruction and the rest of the plurality of pipes process the second specific instruction as a null operation.

7. The method of claim 4, wherein the actions are performed in the order recited.

8. A computer system, comprising:

a microprocessor having a plurality of pipes, a single pipe of the plurality of pipes containing particular functional logic, each of the plurality of pipes being capable of processing a single instruction at a time and each of the plurality of pipes being capable of processing more than one type of instruction;

a memory to store instructions to be processed by the microprocessor and coupled to the microprocessor through a system bus; and a computer-readable medium to store instructions and data to be processed by the microprocessor and coupled to the microprocessor through the system bus, the microprocessor operable to replicate an instruction requiring the particular functional logic and to assign a single replicated instruction to each one of the plurality of pipes;

wherein the single pipe performs one or more operations for the instruction requiring the particular functional logic and the rest of the plurality of pipes process the instruction as a null operation.

9. The computer system of claim 8, wherein each of the plurality of pipes processes an instruction in a single cycle.

10. The computer system of claim 8, wherein there is a one-to-one correspondence between the replicated instructions and the plurality of pipes.

11. The computer system of claim 8, wherein the replicated instructions are placed contiguously in an instruction stream for assignment to the plurality of pipes.

12. The computer system of claim 8, wherein the single pipe contains additional functional logic;

the microprocessor is further operable to replicate an instruction requiring the additional functional logic; and the single pipe performs one or more operations for the instruction requiring the additional functional logic and the rest of the plurality of pipes process the instruction as a null operation.

13. The computer system of claim 8, wherein a single, different pipe contains additional functional logic;

the microprocessor is further operable to replicate an instruction requiring the additional functional logic; and the single, different pipe performs one or more operations for the instruction requiring the additional functional logic and the rest of the plurality of pipes process the instruction as a null operation.

14. A circuit in a multi-pipeline microprocessor, comprising:

a first pipe containing functional logic for a floating point exchange instruction, the first pipe being capable of processing a single instruction at a time and being capable of processing more than one type of instruction; and a second pipe without the functional logic for the floating point exchange instruction, the second pipe being capable of processing a single instruction at a time and being capable of processing more than one type of instruction;

wherein one of the pipes processes the floating point exchange instruction by performing one or more operations and the other pipe processes an identical, replicated floating point exchange instruction as a null operation.

15. The circuit of claim 14, wherein the floating point exchange instruction and the replicated floating point exchange instruction are contiguous in an instruction stream being processed by the circuit.

* * * * *